United States Patent Office 2,847,427
Patented Aug. 12, 1958

2,847,427

Δ⁴ OR 5,16 ANDROSTADIEN-17-ALKYLSULFONES AND SULFOXIDES

Paul B. Sollman, Skokie, and Raymond M. Dodson, Park Ridge, Ill., assignors to G. D. Searle & Co., Chicago, Ill., a corporation of Delaware No Drawing. Application September 9, 1957
Serial No. 682,602

5 Claims. (Cl. 260—397.3)

The present invention relates to new thiosteroids and is specifically concerned with 17-alkylsulfonyl and 17-alkylsulfinyl substitution products of androstadienes and can be represented by the formulae

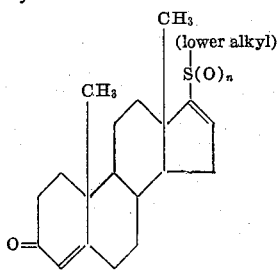

and

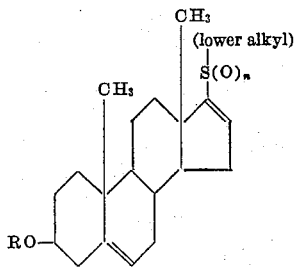

wherein $n$ is an integer selected from the group consisting of 1 and 2, and R is selected from the group of radicals consisting of H and lower alkanoyl having less than 9 carbon atoms. The term lower alkanoyl can represent such acyl radicals as formyl, acetyl, propionyl, butyryl, valeryl, hexanoyl, heptanoyl, octanoyl and branched-chain isomers thereof.

The foregoing general structural representation is not to be interpreted as expressing limitations with respect to the configurations of the valence bonds directed from, or the groups bonded to, the sulfur atom. The sulfoxides of this invention include 17-alkyl-sulfinyl compounds having the partial formulae

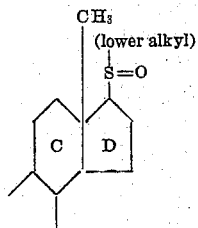

and

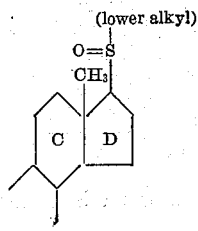

in which the opposite configurations of the sulfoxide oxygen are represented by arbitrary means.

It is further to be noted that for purposes of convenience, the sulfones and sulfoxides are represented herein by their classical covalent bond structures, whereas the modern view, less easily representable, is that these compounds are resonance hybrids of the covalent and semi-polar double bond structures. It will be obvious that lack of agreement among those skilled in the art as to the precise nature of the valence bonds in sulfones and sulfoxides does not in any way limit the useful applications of the compounds of this invention.

Among the starting materials suitable for the manufacture of the compounds of this invention are the 17-alkylthio substitution products of 5,16-androstadien-3-ol and esters thereof, and the 17-alkylthio substitution products of 4,16-androstadien-3-one described in our copending application, Serial No. 579,135, filed April 19, 1956.

In one of the methods suitable for the manufacture of the compounds of this invention, the desired 17-alkylthio-5,16-androstadien-3-ol or its 3-ester, or 4,16-androstadien-3-one starting material is oxidized to the corresponding sulfoxide or sulfone by treatment with a peroxy acid, such as perbenzoic acid. Other peroxide reagents, including performic acid, peracetic acid, and perphthalic acid, are suitable for carrying out this oxidation.

In applying the oxidative procedures of our invention, we have found that the sulfur atom of the 17-(lower) alkylthio substitution product of the chosen starting material is so rapidly oxidized by peroxy acids such as perbenzoic acid, that sulfoxides and sulfones can be prepared in good yield and in a high state of purity without the necessity of protecting the 3-hydroxy or 3-oxo group, or the neighboring double bond, from oxidative attack. For example, treatment of a solution of a 17-alkylthio-5,16-androstadien-3-ol with approximately one molecular equivalent of perbenzoic acid yields predominantly a mixture of isomeric sulfoxides, differing in the spatial arrangement of the alkyl and oxygen atoms with respect to the sulfur. Only small amounts of a sulfone and unreacted starting material are isolated when the oxidation reaction is run in this manner. When a solution of a 17-alkylthio-5,16-androstadien-3-ol is treated with approximately two molecular equivalents of perbenzoic acid, the principal product is the corresponding sulfone. These 3-ol products are converted, if desired, to the corresponding 3-oxo-derivatives by treatment with an oxidizing medium which converts the 5-en-3-ol grouping to a 4-en-3-one, e. g. aluminum isopropoxide in toluene and cyclohexanone.

Treatment of a 17-alkylsulfonyl-5,16-androstadien-3-ol or a 17-alkylsulfinyl-5,16-androstadien-3-ol with an acylating agent such as an acid anhydride or an acid chloride yields the corresponding 3-acyloxy derivative. The same acyloxy derivative can be contained by oxidizing a 3-acyloxy-17-alkylthio-5,16-androstadiene to the sulfoxide or sulfone with perbenzoic acid.

The compounds of this invention have valuable pharmacological properties. Administered conjointly with cortisone, they augment the neoglycogenetic activity of this well-known medicament. In contrast, the 17-alkyl-sulfinyl- and 17-alkylsulfonyl-5-androsten-3-ols and the corresponding 17-alkylsulfinyl- and 17-alkylsulfonyl-4-androstene-3-ones do not exhibit this property.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples quantities are expressed in parts by weight and parts by

Example 1

A stirred solution of 9.5 parts by weight of 17-methylthio-4,16-androstadien-3-one in 900 parts by volume of benzene is treated over a period of 30 minutes by the gradual addition of a 1.38 molar solution of perbenzoic acid in benzene containing a total of 8.3 parts by weight of perbenzoic acid. After an additional one-half hour the solution is extracted with 5% sodium hydroxide solution and then with water. The solution is then dried over sodium sulfate and the solvent removed by distillation. The residue is crystallized from aqueous methanol and recrystallized from a mixture of ethyl acetate and petroleum ether to give purified 17-methylsulfonyl-4,16-androstadien-3-one melting at 157° C. It has the structural formula

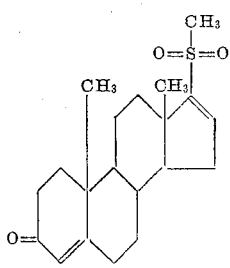

Example 2

A 0.25 molar solution of perbenzoic acid in benzene containing a total of 2.34 parts by weight of perbenzoic acid is added dropwise with stirring to a solution of 5.4 parts by weight of 17-methylthio-5,16-androstadien-3β-ol in 300 parts by volume of benzene. After standing for an additional half-hour, the solution is chromatographed on a column containing 250 parts by weight of silica gel. The column is washed with 4000 parts by volume of a 10% ethyl acetate in benzene solution and eluted first with 4000 parts by volume of 40% ethyl acetate in benzene. This first eluate is concentrated to dryness, the residue crystallized from a mixture of ether and petroleum ether to yield 17-methylsulfonyl-5,16-androstadien-3β-ol which melts at 228–228.5° C. and has the structural formula

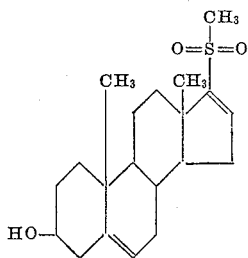

The column is then eluted with 24,000 parts by volume of 10% acetone in ethyl acetate collecting fractions of 1000 parts by volume. Fractions three and four are concentrated to dryness in vacuo. The residue is collected and recrystallized from acetone to yield 17-methylsulfinyl-5,16-androstadien-3β-ol which has a melting point of 235.5–237.5° C. and a specific rotation of −111° in chloroform solution.

Fractions 17 to 24 are combined and the solvent concentrated to dryness in vacuo. The residue is collected and recrystallized from acetone to yield an isomeric sulfoxide which has a melting point of 235–236° C. and a specific rotation of −84° in chloroform solution.

These two isomeric sulfoxides gives a depressed mixed melting point and differ in the spatial orientation of the groups bonded to the sulfur atom and they have the following structural formula

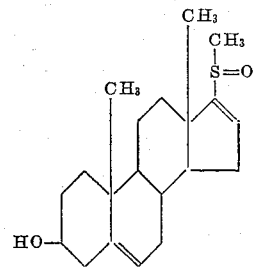

wherein the valence bonds depicted between the sulfur atom and the oxygen atom and between the sulfur atom and the methyl group, are without configurational significance.

Fractions 5 to 16 are combined, the solvent removed in vacuo and the residue collected to give a mixture comprsing two isomeric sulfoxides described above.

If desired, after removal of the 17-methylsulfonyl-5,16-androstadien-3β-ol, the isomeric mixture of sulfoxides is obtained by eluting the column with 10,000 parts by volume of acetone. The eluate is concentrated to dryness and the product recovered.

Example 3

A solution of 1 part by weight of 17-methylsulfonyl-5,16-androstadien-3β-ol, 20 parts by volume of pyridine and 20 parts by volume of acetic anhydride is allowed to stand at room temperature for 16 hours and is then poured into 200 parts of ice water. The precipitated product is collected on a filter, dried and recrystallized from ethyl acetate to give the 3-acetate of 17-methylsulfonyl-5,16-androstadien-3β-ol melting at 215–216° C.

By substituting 30 parts by volume of isobutyric anhydride and otherwise proceeding as above, the 3-isobutyrate of 17-methylsulfonyl-5,16-androstadien-3β-ol is obtained.

In the same manner other 3-acylates are prepared readily as desired.

Example 4

250 parts by weight of aluminum isopropoxide is dissolved in toluene and the solution is diluted with toluene to a total of 1000 parts by volume.

A solution containing 15 parts by volume of the above aluminum isopropoxide solution, 25 parts by volume of cyclohexanone, 250 parts by volume of toluene, and 3.6 parts by weight of a mixture of isomeric 17-methylsulfinyl-5,16-androstadien-3β-ols is refluxed for 25 minutes. The solution is then cooled, diluted with 700 parts by volume of toluene and washed with a 10% solution of Rochelle salt. The toluene solution is then dried over sodium sulfate and distilled to a pale yellow oil. The oil is dissolved in benzene and chromatographed on a silica gel column. Negligible amounts of oils are eluted from the column with 4000 parts by volume of 10% ethyl acetate in benzene. The principal product is eluted with 20,000 parts by volume of a 90% ethyl acetate-benzene solution. This product consists of a mixture of the isomeric 17-methylsulfinyl-4,16-androstadien-3-ones. The product after crystallization from benzene and petroleum ether has a melting point range of 100–110° C., an absorption maximum in the ultraviolet spectrum at 239 millimicrons; $E=19,650$, and absorption maxima in the infrared spectrum of a chloroform solution at 3.33, 3.40, 3.50, 6.00, 6.19, 7.25, 8.02, 9.55, 10.46, 11.52 microns. These two isomeric sulfoxides differ in the spatial orientation of the groups bonded to the sulfur atom and they have the structural formula

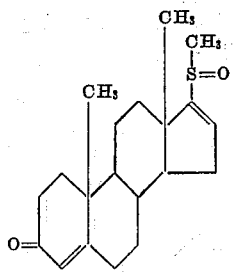

wherein the valence bonds directed between the sulfur atom and the oxygen atom and between the sulfur atom and the methyl group are without configurational significance The silica gel column used in this example may be replaced by a column of 400 parts by weight of alumina for the purpose of chromatographically purifying the 17-methylsulfinyl-4,16-androstadien-3-ones. The mixture of sulfoxides is eluted with 12,000 parts by volume of 10% ethyl acetate in benzene.

*Example 5*

4.7 parts by weight of perbenzoic acid as a 0.25 molar solution of perbenzoic acid in benzene is added dropwise with stirring to a solution of 5.4 parts by weight of 17-methylthio-5,16-androstadien-3β-ol in 300 parts by volume of benzene. After stirring for an additional 5 minutes, the mixture is chromatographed on a column of 250 parts by weight of silica gel. The column is washed with 4000 parts by volume of 10% ethyl acetate in benzene and then eluted with 4000 parts by volume of 10% acetone in ethyl acetate. The solvent is removed from the eluate by evaporation in vacuo and the residue remaining is collected and recrystallized from a mixture of ether and petroleum ether to yield 17-methylsulfonyl-5,16-androstadien-3β-ol; melting point 228–228.5° C.

*Example 6*

A solution is prepared from 9 parts by weight of 3β-hydroxy-5-androstene-17-thione, 80 parts by volume of methanol, 1.6 parts by weight of sodium methoxide and 6.2 parts by weight of 1-iodopropane. An insoluble reaction product soon appears, and when its separation is complete, it is collected on a filter and washed. This compound is 17-propylthio-5,16-androstadien-3β-ol which melts at about 135–138° C. and has the structural formula

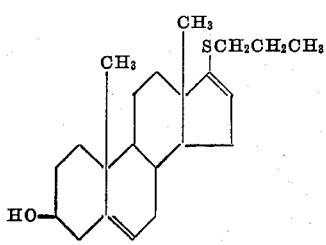

A stirred solution of 3.5 parts by weight of 17-propylthio-5,16-androstadien-3β-ol in 675 parts by volume of benzene is treated by the gradual addition of a 0.3 molar solution of perbenzoic acid in benzene containing a total of 2.9 parts by weight of perbenzoic acid. This operation is carried out over a period of about 20 minutes and after an additional hour at room temperature the reaction mixture is washed with sodium bicarbonate solution and then with water. The residue obtained when the organic phase is concentrated to dryness is dissolved in benzene, and the crude product is reprecipitated by the addition of petroleum ether. Further purification by recrystallization from aqueous ethanol or from a mixture of benzene and petroleum ether yields 17-propylsulfonyl-5,16-androstadien-3β-ol having the structural formula

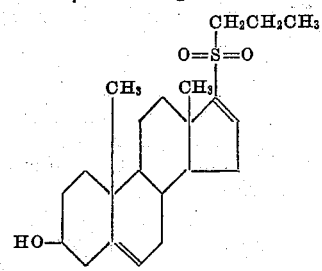

and exhibiting infrared maxima at 2.95, 7.7, 8.8, 9.5, and 10.5 microns (KBr).

A solution of aluminum isopropoxide is prepared by stirring 250 parts by weight of this compound with 1100 parts by volume of toluene, and by decanting from a small amount of insoluble residue.

A mixture of 17 parts by weight of 17-propylsulfonyl-5,16-androstadien-3β-ol, 1100 parts by volume of anhydrous toluene, 90 parts by volume of the solution of aluminum isopropoxide in toluene and 225 parts by volume of cyclohexanone is heated under reflux for 30 minutes. The cooled reaction mixture is treated with a solution of 150 parts by weight of sodium potassium tartrate and 1500 parts by volume of water and distilled with steam. The precipitated product is collected and purified by crystallization from a mixture of benzene and ether to yield 17-propylsulfonyl-4,16-androstadien-3-one having the formula

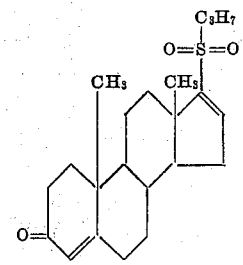

and exhibiting infrared maxima at 6.0, 6.2, 7.7, 8.9, and 10.5 microns (KBr).

*Example 7*

A solution of 2 parts by weight of 3β-hydroxy-5-androsten-17-thione, 100 parts by volume of butanol, 0.67 part by weight of sodium butoxide and 1.23 parts by weight of 1-iodobutane is allowed to stand at room temperature for 16 hours. It is then concentrated under reduced pressure, suitably at a temperature of less than 50° C., to about one-tenth of its original volume, and diluted with 150 parts of water. The insoluble product is collected, washed and recrystallized from methanol or aqueous methanol, whereby there is obtained 17-butylthio-5,16-androstadien-3β-ol of the structural formula

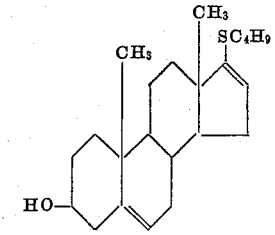

A stirred solution of 1.8 parts by weight of 17-butylthio-5,16-androstadien-3β-ol in 450 parts by volume of benzene is treated over a period of 20 minutes by the gradual addition of a 0.3 molar solution of perbenzoic acid in benzene containing a total of 0.7 part by weight of perbenzoic acid. The reaction mixture is allowed to stand at room temperature for an additional hour, after which it is washed with sodium bicarbonate solution and with water and then concentrated to dryness. Partial purification of the residual product is achieved by redissolving it in benzene and precipitating it by the addition of petroleum ether. Recrystallization from a mixture of benzene and petroleum ether then gives a mixture of isomeric 17-butylsulfinyl-5,16-androstadien-3β-ols differing in the spatial arrangement of the oxygen and methyl groups with respect to the sulfur atom, having the structural formula

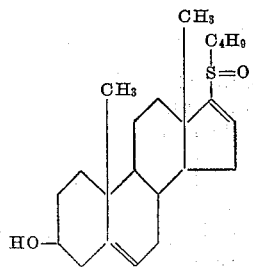

and exhibiting infrared maxima at 2.9, 7.1, 7.3, 9.8, and 10.4 microns (KBr).

A mixture of 18.8 parts by weight of 17-butylsulfinyl-5,16-androstadien-3β-ol, 1100 parts by volume of anhydrous toluene, 90 parts by volume of the solution of aluminum isopropoxide described in Example 6 and 230 parts by volume of cyclohexanone is heated under reflux for 30 minutes. The cooled reaction mixture is treated with a solution of 150 parts by weight of sodium potassium tartrate in 1500 parts by volume of water and distilled with steam. The precipitated product is collected and purified by crystallization from a mixture of benzene and ether to give a mixture of isomeric 17-methylsulfonyl-4,16-androstadien-3-ones differing in the spacial arrangement of the oxygen and methyl groups with respect to the sulfur atom, having the structural formula

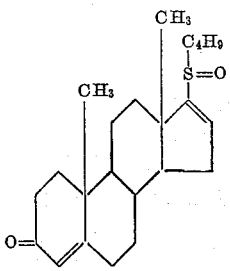

and exhibiting infrared maxima at 3.4, 6.0, 6.2, 9.7, and 10.5 microns (KBr).

What is claimed is:

1. A compound selected from the group of compounds having the formulae

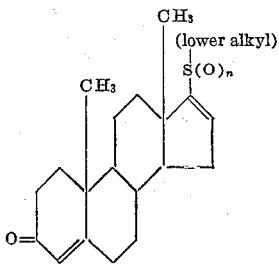

and

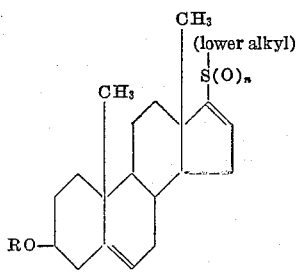

wherein $n$ is an integer selected from the group consisting of 1 and 2, and R is selected from the group of radicals consisting of hydrogen and lower alkanoyl having less than 9 carbon atoms.

2. 17-methylsulfonyl-4,16-androstadien-3-one.
3. 17-methylsulfonyl-5,16-androstadien-3-ol.
4. 17-methylsulfinyl-5,16-androstadien-3-ol.
5. 17-methylsulfinyl-4,16-androstadien-3-one.

References Cited in the file of this patent

UNITED STATES PATENTS 2,753,361    Dodson               July 3, 1956